(12) United States Patent
Arnault et al.

(10) Patent No.: US 11,143,243 B2
(45) Date of Patent: Oct. 12, 2021

(54) SEALED CLUTCH THRUST BEARING DEVICE AND DRIVELINE SYSTEM INCLUDING SUCH A DEVICE

(71) Applicant: AKTIEBOLAGET SKF, Gothenburg (SE)

(72) Inventors: Benoit Arnault, Saint-Cyr-sur-Loire (FR); Benoît Hauvespre, Saint Etienne de Chigny (FR); Thomas Perrotin, Saint Roch (FR); Nicolas Tronquoy, Fondettes (FR); Samuel Viault, Saint-Antoine-du-Rocher (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/853,085

(22) Filed: Apr. 20, 2020

(65) Prior Publication Data
US 2020/0392998 A1   Dec. 17, 2020

(30) Foreign Application Priority Data

Jun. 11, 2019 (DE) .......................... 102019208470.2

(51) Int. Cl.
| F16C 33/78 | (2006.01) |
|---|---|
| F16C 19/16 | (2006.01) |
| F16C 35/06 | (2006.01) |
| F16D 23/14 | (2006.01) |
| F16D 25/08 | (2006.01) |

(52) U.S. Cl.
CPC ........ *F16C 33/7886* (2013.01); *F16C 19/163* (2013.01); *F16C 35/06* (2013.01); *F16D 23/142* (2013.01); *F16D 25/083* (2013.01); *F16C 2361/43* (2013.01)

(58) Field of Classification Search
CPC .... F16C 19/163; F16C 33/7886; F16C 35/06; F16C 35/067; F16C 35/07; F16C 2361/43; F16D 23/14; F16D 23/142; F16D 23/143; F16D 23/147; F16D 23/148; F16D 25/08; F16D 25/082; F16D 25/083; F16D 25/087
See application file for complete search history.

(56) References Cited

U.S. PATENT DOCUMENTS

| 4,606,449 A * | 8/1986 | Lederman ............. F16D 25/044 |
|---|---|---|
| | | 192/85.15 |
| 9,657,785 B2 * | 5/2017 | Arnault ............... F16C 33/7823 |

(Continued)

FOREIGN PATENT DOCUMENTS

DE   102018200783 A1   7/2019

*Primary Examiner* — James Pilkington
(74) *Attorney, Agent, or Firm* — J-TEK Law PLLC; Scott T. Wakeman; Mark A. Ussai

(57) ABSTRACT

A clutch thrust bearing device includes a rolling bearing having a fixed ring, a rotatable ring, and a plurality of rolling elements between the rings; an axially movable piston disposed between a housing and the rolling bearing and having a radial plate pressing against an axial contact surface of the fixed ring; at least one resilient seal member sealing the piston relative to the housing; and a resilient body exerting an axial preload onto an axial contact surface of the rotatable ring. The rolling bearing is axially movable by the piston to compress the resilient body. A resilient sleeve is mounted to the fixed ring and has at least one sealing lip in sliding contact with the rotatable ring.

12 Claims, 4 Drawing Sheets

A-A

(56) References Cited

U.S. PATENT DOCUMENTS

2012/0024614 A1* 2/2012 Sigmund ............ B60K 23/0808
                                                              180/248
2019/0219100 A1   7/2019 Arnault et al.
2019/0277347 A1*  9/2019 Arnault .................. F16D 25/08

* cited by examiner

A-A

SEALED CLUTCH THRUST BEARING DEVICE AND DRIVELINE SYSTEM INCLUDING SUCH A DEVICE

CROSS-REFERENCE

This application claims priority to German patent application no. 10 2019 208 470.2 filed on Jun. 11, 2019, the contents of which are fully incorporated herein by reference.

TECHNICAL FIELD

The present disclosure relates to a clutch thrust bearing device including a bearing. The disclosure also relates to a driveline system including such a device, said system being provided in an all-wheel drive driveline system of a motor vehicle.

BACKGROUND

An all-wheel drive driveline system for a motor vehicle generally comprises a primary front drive axle coupled to a secondary or rear drive axle.

When only two wheels of a four-wheeled vehicle operate as driving wheels, the rear drive system, including the rear drive axle and rear wheels, may be disconnected from the front drive system, including the front drive axle and front wheels. Furthermore, it could be desirable to disconnect only one or both of the rear wheels depending on the operation mode of the motor vehicle.

For this purpose, it is known to provide a rear drive module for the rear drive system, said rear drive module including clutch thrust devices to distribute torque between the front and rear axles and between the two wheels. Clutch thrust devices are also able to disconnect the rear drive system, the wheel being uncoupled from the driveline. Also known are rear drive modules including two clutches, each of the clutches being able to disconnect one rear wheel from the driveline.

Such rear drive modules provide a motor vehicle with both off-road capabilities and high performances on-road, in particular with efficient stability, efficient dynamic operation, and also low fuel consumption.

Advantageously, the clutch thrust devices are of the well-known multi-plate types and include an axially movable piston disposed within a cavity between a clutch bearing and a housing, the piston cavity being connected to a source of hydraulic fluid which may variably provide pressurized fluid in the cavity to axially move said piston. Clutch thrust devices further include a resilient biasing member exerting an axial preload onto the clutch bearing. Said clutch bearing can be moved axially by the piston movement and then actuate a coupling member engaging the plates. It is known to use a clutch bearing with a plurality of rolling elements, for example needles or balls, arranged in a raceway chamber defined between two rings in relative rotation.

Rolling elements and rings are affected by pollution that increases the friction torque within in the clutch bearing which further increases the vehicle fuel consumption and that deteriorates these parts and reduces the clutch bearing service life. It is thus desirable to further improve the performances of such rear drive modules, in particular by protecting the raceway chamber from particles and dust.

SUMMARY

An aspect of the disclosure is to overcome these drawbacks by providing a sealed clutch thrust bearing, in particular for use in a rear drive module of a driveline system of a motor vehicle, that is able to transmit an axial force from an axially movable piston to a resilient biasing member and that reduces friction torque, increases service life, and that allows for an easy and low-cost manufacturing process.

To this end, the disclosure relates to a clutch thrust bearing device comprising a rolling bearing, an axially movable piston, and a resilient biasing member.

The rolling bearing has a fixed ring, a rotatable ring, and a plurality of rolling elements located in a raceway chamber defined between the rings.

The axially movable piston is disposed between a housing and said rolling bearing. The axially movable piston comprises a radial plate pressing against an axial contact surface of a fixed ring. The piston comprises housing sealing means made of resilient material to define a sealed piston cavity with the housing. The piston cavity is connected to a source of hydraulic fluid which may variably provide pressurized fluid in the cavity to axially move said piston.

The resilient biasing member exerts an axial preload onto an axial contact surface of a rotatable ring, and the rolling bearing is axially movable by the piston movement and then compresses the resilient biasing member that actuates a coupling member engaging plates.

According to the disclosure, the device further comprises a sleeve made of resilient material and mounted with the fixed ring, said sleeve comprising at least one sealing lip in sliding contact with the rotatable ring.

According to further aspects of the disclosure which are advantageous but not compulsory, such a ball bearing may incorporate one or several of the following features:

The rolling bearing is a ball bearing, said rolling elements being balls located in a raceway chamber defined between the rings.

The fixed ring is an inner ring, and the rotatable ring is an outer ring.

The fixed ring is an outer ring, and the rotatable ring is an inner ring.

The ball bearing further comprises an annular cage comprising a plurality of pockets that each receive a ball.

The inner ring and the outer ring are made of tempered steel.

The radial plate is made of steel.

The housing sealing elements comprise an inner lip and an outer lip in sliding contact with walls of piston cavity.

The housing sealing means are made of polymer or synthetic material.

The housing element means are overmolded onto the radial plate.

The resilient biasing member is a wavy spring.

The sleeve is made of synthetic or polymer material.

The fixed ring comprises a toroidal portion having a toroidal surface forming a raceway for the balls, and a radial portion that radially extends from said toroidal portion and provided with the axial contact surface in abutment against the axially movable piston.

The sleeve is mounted to a surface of toroidal portion, said surface being radially opposite to the raceway.

The rotatable ring comprises a toroidal portion provided with a toroidal surface forming a raceway for the balls and a radial portion that radially extends from said toroidal portion and provided with the axial contact surface in abutment against the resilient biasing member.

The sealing lip of sleeve is in sliding contact with a surface of radial portion of rotatable ring, said surface being axially opposite to the axial contact surface.

The sleeve comprises an axial annular body, the sealing lip axially extending from said body towards the rotatable ring.

The sleeve comprises a first support portion directed towards the fixed ring and cooperating with the toroidal portion of said ring.

The first support portion is annular and substantially corresponds in shape with the toroidal portion of fixed ring.

The first support portion comprises a first series of ribs spaced in the peripheral direction, said ribs cooperating with a free edge of toroidal portion to block the fixed ring in a first axial direction.

The first support portion comprises a second series of ribs spaced in the peripheral direction, said ribs cooperating with a toroidal surface opposite to raceway of toroidal portion to block the fixed ring an in second axial direction.

The ribs of first and second series are arranged at the same angular positions.

The ribs of first and second series are alternatively arranged in the peripheral direction.

The axially movable piston comprises an axial portion that axially extends from a periphery of radial plate towards the rotatable ring.

The sleeve comprises a second support portion, and directed towards the axial portion of piston.

The second support portion is annular.

The second support portion comprises a plurality of ribs spaced in the peripheral direction.

The axial portion comprises at least one protruding portion that radially protrudes from said axial portion towards the sleeve and cooperates with the second support portion to block the sleeve in one axial direction.

The protruding portion is annular.

The protruding portion is made of resilient material.

The protruding portion is part of a sealing gasket in resilient material, said sealing gasket covering a surface of axial portion.

A lip of housing sealing elements is formed integral with said sealing gasket and protruding portion.

The disclosure also relates to a driveline system of a motor vehicle comprising such a clutch thrust bearing device according to the disclosure for selectively connecting or disconnecting at least one wheel from said driveline system.

Advantageously, the driveline system comprises a front drive system including a front drive axle and front wheels and a rear drive system including a rear drive axle, a rear drive module and rear wheels, said rear drive module being provided with clutch thrust bearing devices according to the disclosure in series, each being able to selectively connect or disconnect one of the rear wheels.

BRIEF DESCRIPTION OF THE DRAWINGS

The disclosure will now be explained in correspondence with the annexed figures, as an illustrative example, without restricting the object of the disclosure. In the annexed figures.

DETAILED DESCRIPTION

Figure 1:
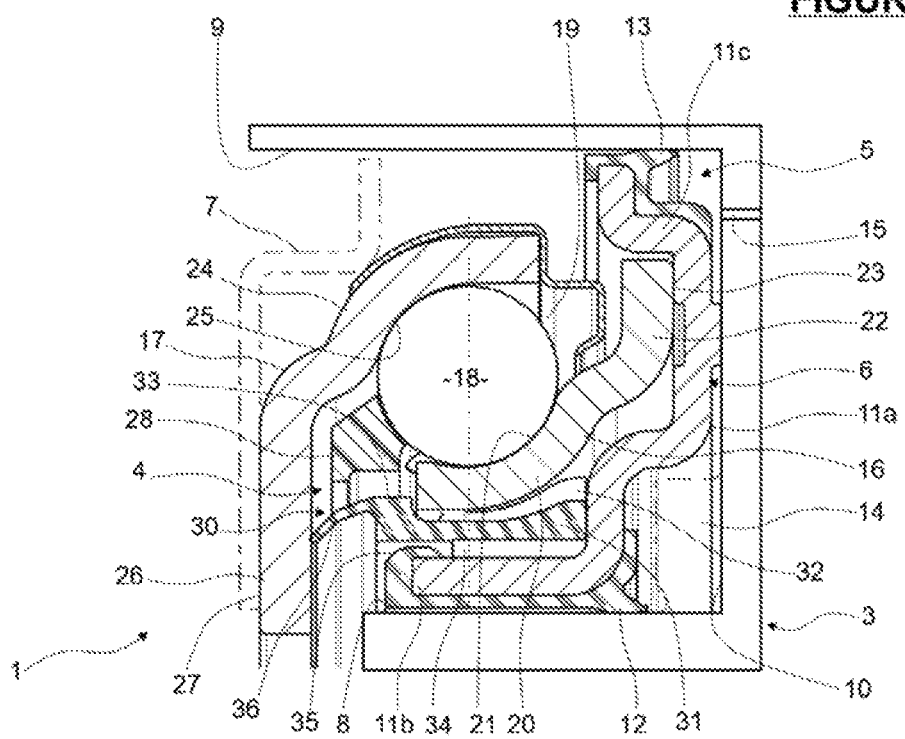
FIG. 1 is an axial section A-A of a clutch thrust bearing device comprising a ball bearing according to a first embodiment of the disclosure.

As illustrated in FIG. 1, a clutch thrust bearing device 1 is advantageously integrated in a driveline system of a motor vehicle (not shown). The clutch thrust bearing device 1 is substantially annular and centered on a central axis.

The clutch thrust bearing device 1 comprises a fixed housing 3, a rolling bearing, here a ball bearing 4, said fixed housing 3 and ball bearing 4 defining a cavity 5 wherein an axially movable piston 6 is arranged, and a resilient biasing member 7 shown by way of a dot-dashed line, for example a wavy spring.

The housing 3 is fixed, and advantageously is a part of a rear drive module of the driveline system. The housing comprises the annular cavity 5 centered on the central axis. The cavity 5 is defined between two lateral walls 8, 9, and a bottom surface 10, said cavity 5 being axially open to the ball bearing 4.

The piston 6 is annular, is centered on the central axis, and is arranged within the cavity 5 of housing 3. The piston 6 comprises a substantially radial plate 11a extending radially between the two lateral walls 8, 9 of cavity 5. The piston 6 has an inner axial portion 11b that extends axially from the inner periphery of the radial plate 11a towards the ball bearing 4, and an outer axial portion 11c that extends axially from the outer periphery of the radial plate 11a towards the ball bearing 4.

Advantageously, the piston 6 further comprises inner sealing means 12 made of resilient material and provided at the inner bore of the radial plate 11a, said sealing means including a sealing lip in sliding contact with the lateral wall 8 of the cavity 5. The piston 6 also comprises outer sealing means 13 made of resilient material and provided at the outer side of the radial plate 11a, said sealing means being provided with a sealing lip in sliding contact with the lateral wall 9 of cavity 5. Advantageously, the inner sealing means 12 is attached to the inner axial portion 11b, and the outer sealing means 13 is attached to the outer axial portion 11c. Advantageously, the sealing means 12, 13 are made of polymer or synthetic material. Advantageously, the sealing means 12, 13 are overmolded onto the axial portions 11b, 11c, respectively.

The piston 6, the lateral walls 8 and 9 and the bottom surface 10 define a sealed cavity 14. At least one channel 15 is provided through the housing 3 to connect the sealed cavity 14 with a source of hydraulic fluid (not shown) which may variably provide pressurized fluid in the sealed cavity 14 to axially move said piston 6. The lateral walls 8, 9 of cavity 5 provide lateral guidance for the piston 6.

In the present embodiment, the substantially radial plate 11a of the piston 6 has a shape adapted to the ball bearing 4. Alternatively, the substantially radial plate 11a may have any other suitable shape.

The ball bearing 4 is annular and centered on the central axis. The ball bearing 4 is at least partly arranged in the cavity 5 of the housing 3, the piston 6 being axially interposed between the bottom surface 10 of said cavity 5 and the ball bearing 4.

The ball bearing 4 comprises a fixed inner ring 16, a rotatable outer ring 17, and one series of balls 18 located in a raceway chamber 19 defined between the rings 16, 17. Alternatively, the bearing 4 may comprise any other suitable type of rolling elements, such as rollers or needles.

The fixed inner ring 16 comprises a toroidal portion 20 that has an outside toroidal surface 21 forming an inner raceway for the balls 18, and a radial portion 22 that extends radially outwardly from said toroidal portion 20. Said radial portion 22 has an axial contact surface 23 pressing against the radial plate 11a of the axially movable piston 6. The ball bearing 4 is set in axial movement by the transmission of the movement of piston 6 to the axial contact surface 23 of fixed inner ring 16.

The rotatable outer ring 17 comprises a toroidal portion 24 that has an inner toroidal surface 25 forming an outer raceway for the balls 18.

Advantageously, the rotatable outer ring 17 further comprises a radial portion 26 that extends radially outwardly from an inner side of said toroidal portion 24. Said radial portion 26 has an axial contact surface 27 in axial abutment against the resilient biasing member 7.

As an alternate (not shown), the rotatable ring cooperating with the resilient biasing member 7 may be an inner ring, and the fixed ring cooperating with the axially movable piston 6 may be an outer ring.

Advantageously, the ball bearing 4 further comprises an annular cage 28 comprising a plurality of pockets that each receive a ball 18. Balls 18 are then circumferentially equally spaced and held.

According to the disclosure, the device 1 further comprises a sleeve 30 made of resilient material and mounted with the fixed inner ring 16.

Figure 3:
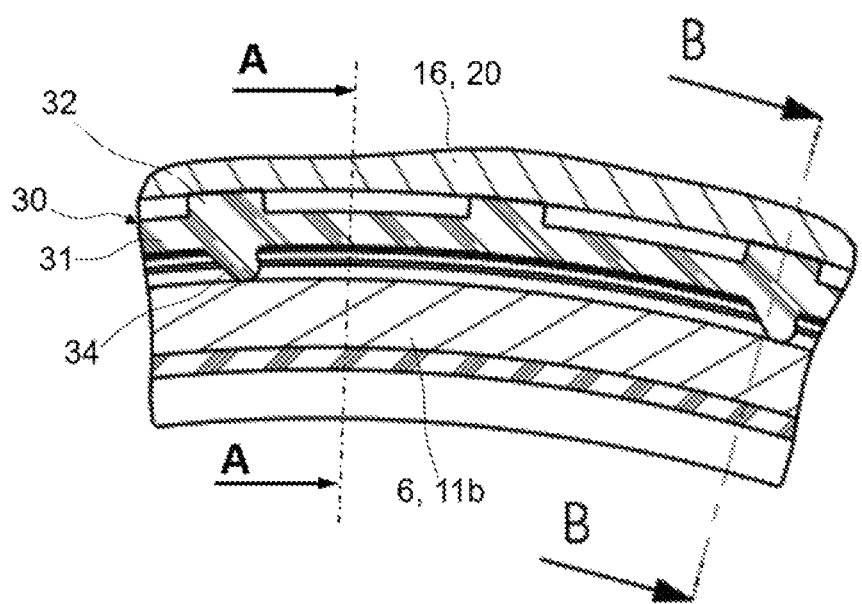
FIG. 3 is a radial section of a clutch thrust bearing device of FIGS. 1 and 2.

The sleeve 30 comprises an annular body 31 arranged in a bore defined by the toroidal portion 20 of the fixed inner ring 16. The sleeve 30 further comprises a first support portion 32, directed towards the fixed inner ring 16 and cooperating with the toroidal portion 20 of said ring 16. The first support portion 32 substantially corresponds in shape to the inner surface of said toroidal portion 20. As illustrated in FIG. 3, the first support portion 32 according to a first embodiment of the disclosure comprises a series of ribs spaced in the peripheral direction, said ribs cooperating with inner surface of toroidal portion 20 to block the fixed ring 16 in a first axial direction towards the piston 6. Alternatively, the first support portion 32 is annular.

The annular body 31 comprises a shoulder 33 directed towards the bearing 4 and forming a stop for a free edge of the toroidal portion 20 to block the fixed ring 16 in a second axial direction opposite to said first axial direction. The sleeve 30 is then attached to inner ring 16 thanks to shoulder 33 on one axial side and ribs on a second axial side. Sleeve 30 can be mounted into the toroidal portion 20 by deforming the resilient material.

The sleeve 30 further comprises a second support portion 34, directed towards the inner axial portion 11b of the piston 6. The second support portion 34 is mounted on the outer surface of said inner axial portion 11b. The second support portion 34 substantially corresponds in shape with the inner axial portion 11b. As illustrated in FIG. 3, the second support portion 34 according to a first embodiment of the disclosure comprises a series of ribs spaced in the peripheral direction, said ribs cooperating with the inner surface of the inner axial portion 11b. Said second support portion 34 is blocked by the radial plate 11 of the piston 6 in a first axial direction. Alternatively, the second support portion 34 is annular.

Figure 2:
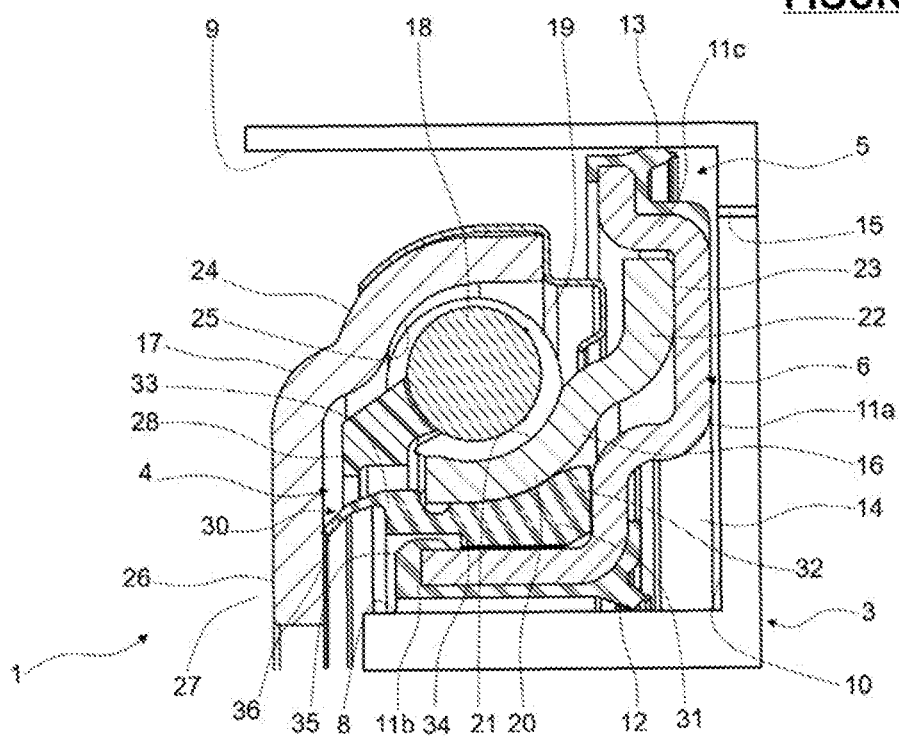
FIG. 2 is an axial section B-B of the clutch thrust bearing device of FIG. 1.

As illustrated in FIGS. 1 and 2, the free end of inner axial portion 11b of piston 6 is provided with a radial protrusion 35. The radial protrusion 35 may be annular or comprise a plurality of portions spaced in the peripheral direction. Said portion 35 cooperates with the second support portion 34 of the sleeve 34 to block the sleeve 30 with respect to the piston 6 in a second axial direction opposite to said first axial direction. Advantageously, the radial protrusion 35 is made of resilient material, and said protrusion 35 is deformed when mounting the piston 6 with sleeve 30. Advantageously, the radial protrusion 35 is made of synthetic or polymer material, and is advantageously molded onto the inner axial portion 11b. Advantageously, the radial protrusion 35 is formed integral with the inner sealing lip 12.

Sleeve 30 is then mounted between and attached to the fixed inner ring 16 and the piston 6.

According to another embodiment of the disclosure, said sleeve 30 also comprises at least one annular sealing lip 36 in sliding contact with the radial portion 26 of the rotatable outer ring 17. The sleeve 36 extends axially from the axial body 31 towards the rotatable outer ring 17. As an alternate not illustrated, the sleeve 30 may comprises two or more sealing lips in sliding contact or forming a labyrinth seal with the rotatable outer ring 17.

Figure 4:
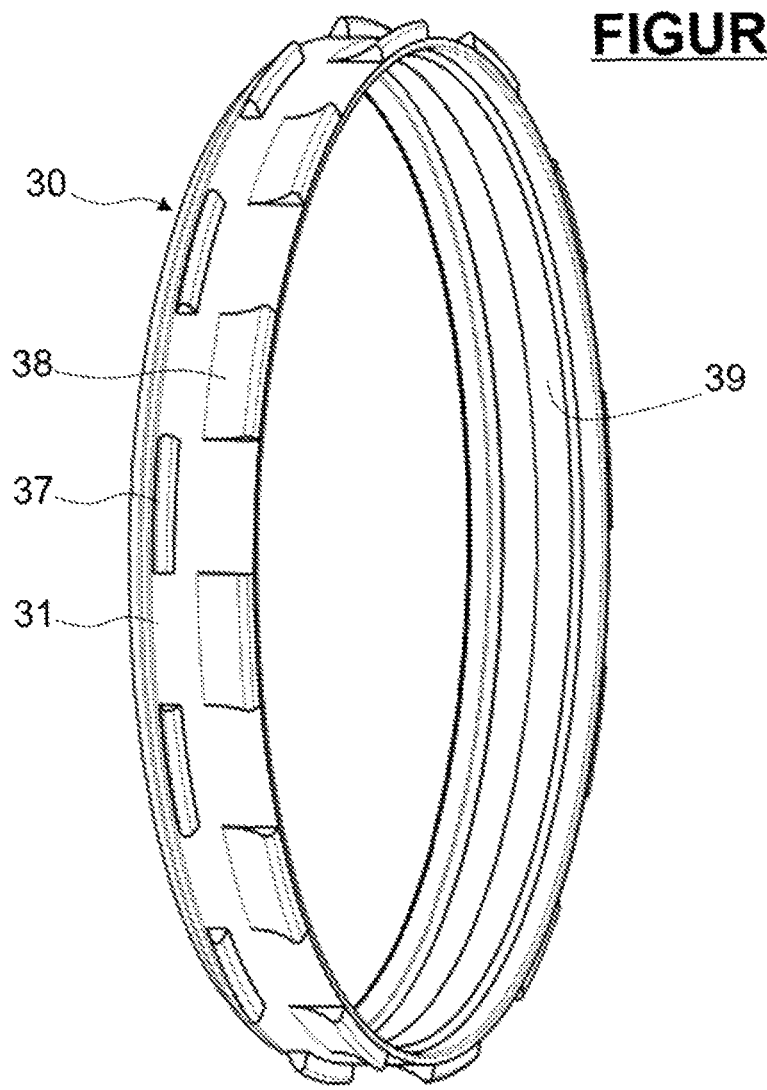
FIG. 4 is a perspective view of a sleeve according to a second embodiment of the disclosure.

Another embodiment of the disclosure is illustrated in FIG. 4. The sleeve 30 comprises an annular body 31 provided with a first series of ribs 37 spaced in the peripheral direction, said ribs 37 cooperating with a free edge of the toroidal portion 20 to block the inner fixed ring 16 in a first axial direction. The sleeve 30 also comprises a second series of ribs 38 spaced in the peripheral direction, said ribs 38 cooperating with a toroidal surface opposite to the raceway 21 of the toroidal portion 20 to block the fixed ring 16 in a second axial direction. The ribs 37, 38 of the first and second series are alternatively arranged in the peripheral direction. According to an alternate embodiment, the ribs of first and second series are arranged at the same angular positions.

In the embodiment illustrated in FIG. 4, the sleeve 30 comprises a second support portion 39, directed towards an inner axial portion of piston, and configured to cooperate with said inner axial portion. Second support portion 39 is annular.

Representative, non-limiting examples of the present invention were described above in details with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved ball bearing.

Moreover, various features of the above-described representative examples, as well as the various independent and dependent claims below, may be combined in ways that are not specifically and explicitly enumerated in order to provide additional useful embodiments of the present teachings.

What is claimed is:

1. A clutch thrust bearing device comprising:
   a rolling bearing having a fixed ring, a rotatable ring, and a plurality of rolling elements located in a raceway chamber defined between the rings;
   an axially movable piston disposed between a housing and the rolling bearing, the axially movable piston having a radial plate pressing against an axial contact surface of the fixed ring,
   at least one resilient seal member sealing the piston relative to the housing and forming a piston cavity, the piston cavity being connectable to a source of hydraulic fluid for providing a variable fluid pressure to the cavity to move the piston axially;

a resilient body exerting an axial preload onto an axial contact surface of the rotatable ring, the rolling bearing being axially movable by the piston to compress the resilient body; and a resilient sleeve mounted to the fixed ring, the resilient sleeve comprising at least one sealing lip in sliding contact with the rotatable ring, wherein the resilient seal member includes a radial protrusion configured to limit axially movement of the resilient sleeve relative to the piston.

2. The device according to claim 1, wherein the rolling elements are balls, wherein the fixed ring comprises a toroidal portion having a toroidal surface forming a raceway for the balls and a radial portion extending radially from the toroidal portion, and wherein the resilient sleeve is mounted to a surface of the toroidal portion radially opposite to the raceway.

3. The device according to claim 1, wherein the rolling elements are balls, wherein the rotatable ring comprises a toroidal portion having a toroidal surface forming a raceway for the balls and a radial portion extending radially from the toroidal portion, and wherein the sealing lip of the resilient sleeve is in sliding contact with a surface of the radial portion of rotatable ring axially opposite to the axial contact surface.

4. The device according to claim 1, wherein the resilient sleeve comprises a cylindrical body portion and wherein the sealing lip extends axially from the cylindrical body towards the rotatable ring.

5. The device according to claim 4, wherein the resilient sleeve comprises a first support portion directed towards the fixed ring and cooperating with the toroidal portion of the fixed ring.

6. The device according to claim 5, wherein the axially movable piston comprises an axial portion that extends axially from a periphery of the radial plate towards the rotatable ring, and wherein the resilient sleeve comprises a second support portion directed towards the axial portion of piston.

7. The device according to claim 1, wherein the rolling elements are balls, wherein the fixed ring comprises a toroidal portion having a first toroidal surface forming a raceway for the balls and a second toroidal surface opposite the first toroidal surface and a radial portion extending radially from the toroidal portion, wherein the axially movable piston comprises an axial portion extending axially from a periphery of the radial plate towards the rotatable ring, and wherein the resilient sleeve has a first side in contact with the second toroidal surface and a second side in contact with the axial portion of the piston.

8. The device according to claim 1, wherein the piston includes an axial portion adjacent to and spaced from the housing, and wherein a first portion of the resilient seal member extends between the axial portion and the housing and a second portion of the resilient member extends from the first portion of the resilient member around an axial end of the piston to the radial protrusion.

9. The device according to claim 8, wherein the resilient seal member includes a lip in sliding contact with the housing.

10. The device according to claim 1, wherein at least a portion of the radial protrusion is located radially between the resilient sleeve and the piston.

11. The device according to claim 1, wherein the resilient seal member includes a lip in sliding contact with the housing.

12. The device according to claim 1, wherein the piston includes an axial portion adjacent to and spaced from the housing, wherein a first portion of the resilient seal member extends between the axial portion and the housing, wherein a second portion of the resilient seal member extends from the first portion of the resilient seal member around an axially end of the cylindrical portion of the piston to the radial protrusion, wherein the resilient seal member includes a lip in sliding contact with the housing, and wherein at least a portion of the radial protrusion is located radially between the resilient sleeve and the axial portion of the piston.

* * * * *